United States Patent [19]

Olcott et al.

[11] 4,110,390

[45] Aug. 29, 1978

[54] PROCESS FOR FORMING A MOLDED PLASTIC ARTICLE HAVING AN INSERT THEREIN

[75] Inventors: Tyler Keith Olcott, Valentines, Va.; Robert M. Miller, Lakeland, Fla.

[73] Assignee: W. R. Grace & Co., Duncan, S.C.

[21] Appl. No.: 733,549

[22] Filed: Oct. 18, 1976

[51] Int. Cl.² .................. B29C 17/07; B29D 3/00
[52] U.S. Cl. ........................... 264/90; 264/94; 264/139; 264/264; 264/274
[58] Field of Search ............... 264/139, 246, 247, 264, 264/271, 274, 275, 279, 89, 90, 92, 94, 96–99; 248/466, 479, 481, 484

[56] References Cited

U.S. PATENT DOCUMENTS

| | | | |
|---|---|---|---|
| 2,706,833 | 4/1955 | Doherty | 264/264 X |
| 2,911,177 | 11/1959 | West | 248/484 |
| 2,959,812 | 11/1960 | Allen | 264/98 X |
| 3,108,850 | 10/1963 | Brandt | 264/98 X |
| 3,427,095 | 2/1969 | Dykema et al. | 248/481 X |
| 3,654,003 | 4/1972 | Grossman | 264/139 X |
| 3,742,995 | 7/1973 | Confer et al. | 264/274 X |
| 3,839,129 | 10/1974 | Neumann | 264/247 X |

FOREIGN PATENT DOCUMENTS

| | | | |
|---|---|---|---|
| 952,674 | 8/1974 | Canada | 264/247 |
| 46-9,959 | 3/1971 | Japan | 264/247 |

Primary Examiner—Jan H. Silbaugh
Attorney, Agent, or Firm—John J. Toney; William D. Lee, Jr.; John B. Hardaway

[57] ABSTRACT

A molded plastic article having either a transparent window or a mirror insert therein is produced by molding a plastic mass around the insert with a layer of insulation or parting material interposed between the plastic mass and the insert.

8 Claims, 6 Drawing Figures

PROCESS FOR FORMING A MOLDED PLASTIC ARTICLE HAVING AN INSERT THEREIN

BACKGROUND OF THE INVENTION

Conventionally, molded articles with inserts have been produced by disposing an insert within a mold cavity such that a portion of the insert having irregularities or discontinuities therein is covered with the molded material while a portion of the insert is isolated from the molding process by extending through a cavity in the mold wall. The molded article is thus attached to the insert by the configuration of the discontinuity in the insert such that a gripping relationship is achieved between the plastic mass and the insert. Examples of such techniques are described in U.S. Pat. No. 3,742,995 and U.S. Pat. No. 3,705,931.

The forming of molded objects having windows therein has presented a particular problem to the art. One process utilizing a molded foam plastic comprises the step of pressing an area of the molded form at an elevated temperature to collapse the plastic foam at the point of pressing to reform that plastic into a thin film which is transparent. A process of this type is described in U.S. Pat. No. 3,432,380. Window type inserts have also been included in molded articles by first forming the article by conventional techniques and then physically cutting a portion of that article to provide an opening over which a window can be placed. Generally, the window will comprise either a transparent acrylic sheet or a glass sheet which is attached to the molded plastic article by means of an adhesive or some other appropriate means.

The mounting of mirrors, particularly automobile mirrors, has long presented a problem to the art. Conventionally, such mirrors have been mounted in metal frames which are mechanically tightened to grip the mirror and retain it in a desired position. The metal housing portion of this article serves the further purpose of providing a means of connecting the mirror to some other appropriately positioned support. The likelihood of breakage and general deficiencies of such an arrangement are readily apparent. An improvement upon the use of a metal housing is described in German Patent No. 2,256,974. In accordance with this German patent, an automobile mirror is provided with a plastic edge molding which extends about the perimeter of the mirror. The mirror with the molding is thus inserted into a mold wherein the hollow area above the back of the mirror encompassed by the molding is filled with a foamable plastic which bonds with the molding. The newly applied foamed plastic can additionally be provided with means for attaching the thus produced mirror assembly to a predetermined support. The improvement in mirror protection and housing provided by this technique is readily apparent. While the use of a molded plastic housing provides protection for the mounted mirror, it suffers from the disadvantage of high product losses during the forming step wherein the glass mirror is contacted with the plastic in the viscous state under pressurized conditions.

Plastic housings for mirrors and other glass components have been provided from injection molded components which are assembled in much the same manner as are metal components.

SUMMARY OF THE INVENTION

It is thus an object of this invention to provide a novel molded plastic article having an insert therein.

It is a further object of this invention to provide such an article wherein the insert is a thermally shockable article.

It is a further object of this invention to provide such an article wherein the insert is either a transparent window or a glass mirror.

It is a still further object of this invention to provide a novel process for molding an article while simultaneously providing an insert within that article.

It is yet a still further object of this invention to provide a process for blow molding a plastic article having a transparent or mirror insert therein.

These as well as other objects are accomplished by providing a parting or insulating layer between a surfaces of an insert and the thermoplastic material into which the insert is mounted.

DETAILED DESCRIPTION

According to this invention it has been found that plastic molded articles can be provided with inserts during the process of molding by disposing the insert within the mold and interposing a parting or insulating layer between the hot viscous plastic and the insert. Further in accordance with this invention it has been found that thermally shockable or meltable inserts such as glass mirror articles or plastic articles can be encompassed within a molded plastic article by interposing an insulating layer between the back of the insert and the hot plastic mass in the mold. A parting layer may be interposed in accordance with this invention when the insert is likely to adhere to the thermoplastic and the thermoplastic is to be separated from the insert after hardening.

In accordance with an aspect of this invention it has been discovered that the loss of mirrors during a plastic molding process is in large part due to the thermal shock associated with the hot plastic mass contacting the mirror. Thus, by the process of this invention, the problem is overcome by interposing an insulating layer between the hot plastic mass and the thermally shockable mirror to minimize the formation of thermal stresses within the mirror and prevent the fracture thereof during the molding step. It has been additionally found that such a layer may be utilizied as a parting layer or release agent even when a thermally shockable insert is not utilized. By so doing the rear portion of such an article may be cut away through the parting layer to thus provide an insert which is open on both sides but gripped around the edges by the plastic mass. Such an arrangement provides a molded plastic mass having a window therein. The articles and the process of this invention will be more readily understood from the following particularized description with reference to the various figures of drawing.

Figure 1:
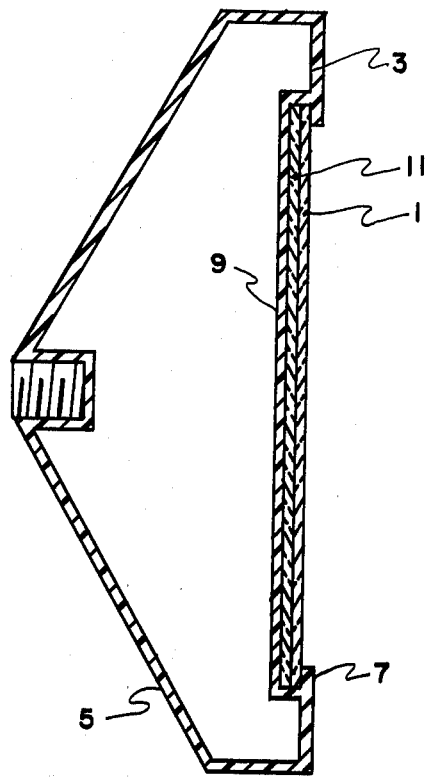
FIG. 1 is a cross section view of a double wall article in accordance with this invention.

FIG. 1 of the drawings illustrates an article in accordance with this invention. The article is illustrated here as a rear view mirror for use on a motor vehicle. As is illustrated, a thermally shockable glass mirror insert 1 is encompassed and gripped by a molded plastic mass 3. The insert 1 is locked within the overall assembly 5 by the gripping force of overlying sections 7 and back portion 9. The insert, in this case a glass mirror, is provided with a layer of insulation 11 immediately behind and adjacent the glass insert such that the rear section of the glass mirror 1 is not contacted by the melt during the forming process. Such an article is formed by a conventional molding process modified by the addition of an insert with a layer of insulation within a mold. The forming process may be better understood by referring to FIG. 2 of the drawings.

Figure 2:
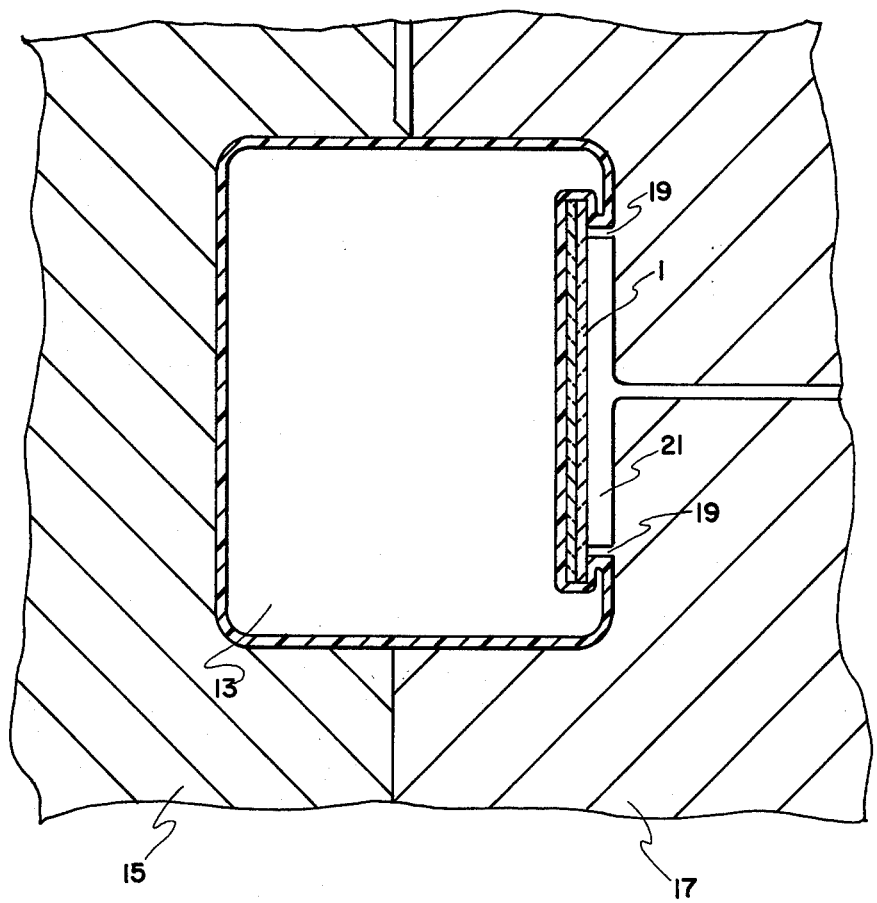
FIG. 2 is a cross section view of a double wall article being molded in accordance with this invention.

FIG. 2 illustrates a blow molding apparatus for forming an article in accordance with this invention. A cavity 13 is defined by mold halves 15 and 17. The insert 1, such as a glass mirror, is maintained within the cavity 13 by contact with spacer 19. Spacer 19 defines an area 21 which is not in fluid communication with the remainder of the mold cavity 13. Thus, when insert 1 is placed on spacer 19, the void 21 is totally noncommunicative with the remainder of void 13. Spacer 19 is positioned so as to provide only a small overlap between the edge of the glass mirror and the spacer. This overlap is to provide the overlying area 7 shown in FIG. 1. The overlying area is essential to the existence of a grip between the plastic mass and the insert. The overlying area 7, however, is preferably maintained as small as possible so as to minimize the thermal shock which results from the contact of the hot plastic mass at this point. Generally an overlying distance of about one thirtieth of an inch provides the necessary grip and minimization of thermal stresses. The layer of insulation 11 on the inside of the insert totally blocks out the flow of heat in this area so the remainder of the insert 1 is not subject to thermal stresses which can lead to thermal shock and fracture of the insert 1.

The layer of insulation 11 can be attached to the back side of the insert 1 by any convenient technique. Conventional attachment techniques such as glue, adhesive tape and vacuum trapping may be used with equal efficacy. Some applications may lend themselves to mechanical attachment such as by the use of screw or nail fasteners.

The technique of this invention as applicable to any conventional thermoforming process. Amongst such processes are included both injection and blow molding processes.

Figure 3:
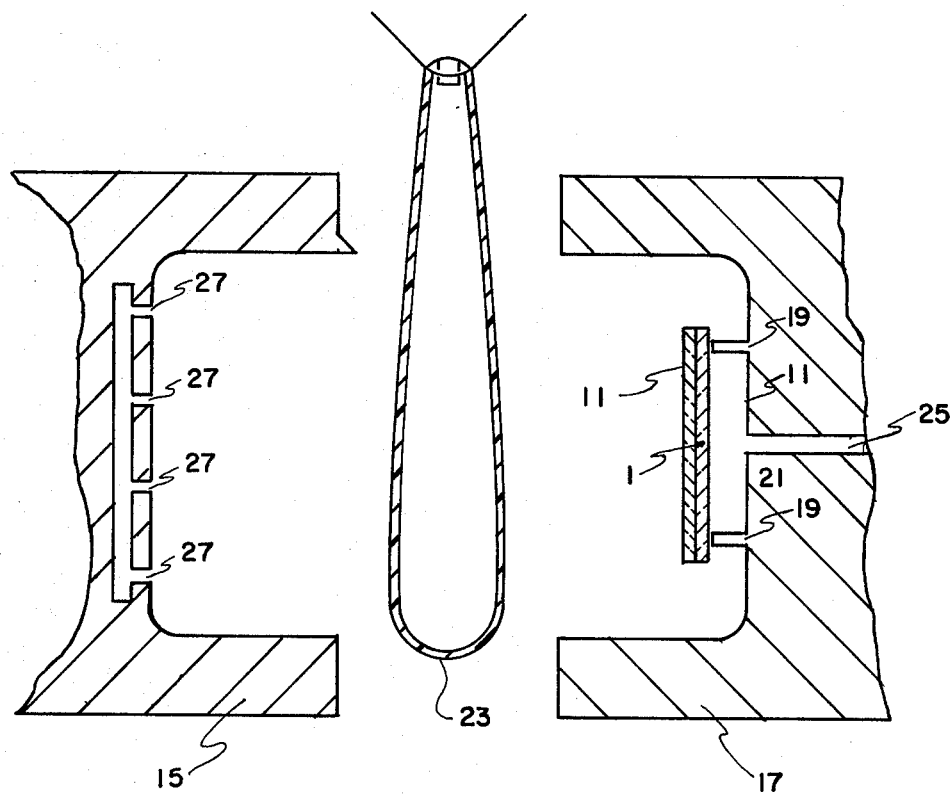
FIG. 3 is a view in cross section of a blow mold operated in accordance with this invention.
Figure 4:
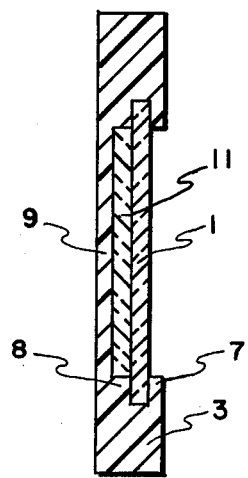
FIGS. 4 and 5 are views in cross section of articles in accordance with this invention.

Preferably the articles of this invention are formed by a blow molding process which is more particularly illustrated in FIG. 3. As is shown therein a parison 23 is blown against the mold halves 15 and 17 as the mold halves close around the parison 23. The article 1 with its layer of insulation 11 is held in the appropriate position by the creation of a vacuum through conduit 25 which maintains the insert in position against spacer 19. By closing the mold and drawing a vacuum through ports 27 as the mold closes, the parison is drawn against the mold walls. Such blow molding techniques are well described in U.S. Pat. Nos. 3,317,955 and 3,452,125 which are herewith incorporated by reference. The blow molding process illustrated in FIG. 2 and 3 and the article shown in FIG. 1 are illustrated with a dual wall construction. It is understood, however, that the blow molding process may be carried out to produce an article having dual walls which impinge upon one another to create but a single wall. Such a structure is generally illustrated in FIG. 4 of the drawing.

The types of hardenable material which are utilized in this invention are the conventional thermoplastic materials which are utilized in the prior art processes of molding plastic articles. Polyethylene is the preferred thermoplastic material for use with this invention. Generally, any material existing in a thermoplastic state can be utilized for forming an article in accordance with this invention. Such thermoplastic materials are molded in the temperature range of from about 250° to 600° F. This temperature range is sufficiently high to provide ample thermal stress within a thermally shockable article substantially endanger the structural stability of the resulting article were it not for the layer of insulation 11. The layer of insulation 11 may be composed of any conventional insulating material preferably polyethylene or polystyrene foamed sheets are utilized within the process of this invention. Sheets of 0.05 inch in thickness have been found satisfactory for preventing thermal shock in the mirror article insert. Various other insulating materials may also be utilized. Such materials include paper, fiberglass, wood and asbestos.

It is thus seen that the process of this invention produces a unique article which could not heretofore be produced. While the above description has emphasized the use of a thermally shockable glass mirror, it is readily apparent that any thermally shockable material may be utilized within the scope of this invention. The drawings have also illustrated a thermally planar material. It is further understood that any shaped material may be utilized. The process of this invention is particularly applicable to forming a plastic housing surrounding either a convex or concave mirror for use as a motor vehicle mirror.

Figure 5:
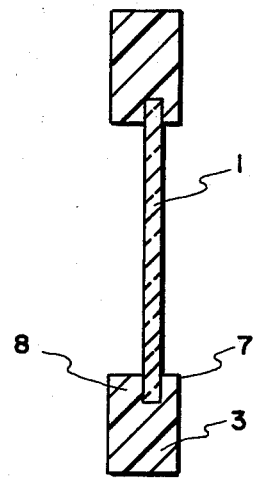

As a further aspect of this invention, it has been found that the insulating layer functions as a parting layer should the plastic material surrounding the back side of the insert be removed. Such an article is illustrated in FIG. 5. The article of FIG. 5 is produced by cutting the plastic material away from an article produced as described above and shown in FIG. 4 so as to remove that plastic portion which backs the insulation and the insulating portion 11. This process has been found to surprisingly make the preparation of a molded plastic article having a window therein become feasible. When an insert is intended for use as a window it is preferred to utilize an insulating layer which is slightly smaller than the insert so as to provide an overlying back area 8 matching the overlying frontal area 7. However, a keyed insert as shown in FIG. 6 may also be utilized so as to eliminate the need for an overlying area.

The insert 1 need not necessarily be composed of a thermally shockable material such as glass but can be a transparent plastic such as acrylic, polycarbonate, cellulose and polystyrene. In this event, the layer of insulation need not function as a heat barrier for the higher melting materials. The layer 11 can be of a non-insulating material such as cotton. The main function of the parting layer 11 in this mode of operation is to prevent the hardened plastic mass from adhering to the insert 1. When using plastics with a low melting point a layer of insulation serves the dual roll of preventing melting and acting as a parting layer.

Figure 6:
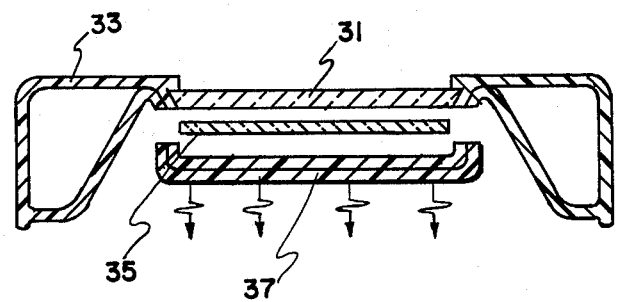
FIG. 6 is a view in cross section of an article with an under cut insert produced in accordance with this invention.

FIG. 6 of the drawings illustrates another preferred form of this invention. This aspect of the invention utilizes a keyed insert 31 which requires no overlying areas. The keyed insert 31 is locked into the single wall blow molded article 33 by virtue of the shape of the end portion thereof. FIG. 6 further illustrates how an insulating or parting layer 35 and excess thermoplastic 37 are removed from this configuration to leave a window.

Fragile inserts other than windows and mirrors are also embodied within the scope of this invention. From the above description it is readily apparent that such objects as the thermometers and clocks can be encased in plastic housings by this invention without being subjected to the heat of the molding environment.

The use of molded plastic having a window therein solves a problem which has long confronted the packaging industry. A plastic package having a window therein for product display has long been wanted within the industry. The article and the process of this invention fulfills this long felt need. Many variations in the articles and process of this invention will be apparent to those skilled in the art. Such variations, however, are embodied within the scope of this invention as is measured by the appended claims.

We claim:

1. A process for forming a molded hardened plastic article having an insert of a thermally shockable material said thermally shockable material being a material which fractures when subjected to sufficient thermal stress comprising the steps of:

(a) disposing said thermally shockable insert so as to expose a surface of said insert to a molding environment;
    (b) placing a layer of insulating material in contiguous relationship with said surface;
    (c) covering said layer of insulation with a plastic mass which is at a higher temperature than said thermally shockable insert, said layer of insulating material being effective to prevent said higher temperature from creating sufficient thermal stress to fracture said insert; and
    (d) cooling said hardenable plastic mass to harden said mass into a gripping relationship partially encompassing said thermally shockable insert.

2. The process according to claim 1 wherein said insulating material is composed of a member selected from the group consisting of polyethylene foam, polystyrene foam, asbestos and fiberglass.

3. The process according to claim 1 wherein said thermally shockable insert is glass.

4. The process according to claim 1 wherein said thermally shockable insert is a mirror.

5. The process according to claim 1 including the further step of removing a portion of said hardened mass and said insulation from said exposed surface.

6. The process according to claim 1 wherein said molding environment is a blow molding process.

7. The process according to claim 6 wherein said step of disposing comprises maintaining said thermally shockable insert in position within a blow mold by suction.

8. The process according to claim 1 wherein said molding environment is an injection molding process.

* * * * *